(12) United States Patent
Cudak et al.

(10) Patent No.: US 10,116,711 B2
(45) Date of Patent: Oct. 30, 2018

(54) DETERMINING AND PROVIDING DATA RELATED TO COLLABORATION EVENT

(71) Applicant: Lenovo Enterprise Solutions (Singapore) PTE. LTD., New Tech Park (SG)

(72) Inventors: Gary David Cudak, Wake Forest, NC (US); Joseph Francis Herman, Raleigh, NC (US); William James Sommerville, Raleigh, NC (US); Laura Ann Weaver, Chapel Hill, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 374 days.

(21) Appl. No.: 14/968,143

(22) Filed: Dec. 14, 2015

(65) Prior Publication Data

US 2017/0171263 A1    Jun. 15, 2017

(51) Int. Cl.
*G06F 15/16* (2006.01)
*H04L 29/06* (2006.01)
*H04L 29/08* (2006.01)

(52) U.S. Cl.
CPC ........ *H04L 65/403* (2013.01); *H04L 65/1089* (2013.01); *H04L 67/18* (2013.01)

(58) Field of Classification Search
None
See application file for complete search history.

(56) References Cited

U.S. PATENT DOCUMENTS

| 2004/0064355 A1* | 4/2004 | Dorenbosch | G06Q 10/109 705/7.19 |
|---|---|---|---|
| 2008/0126480 A1* | 5/2008 | Hintermeister | G06Q 10/10 709/204 |
| 2009/0005072 A1* | 1/2009 | Forstall | G01C 21/20 455/456.1 |
| 2010/0005142 A1* | 1/2010 | Xiao | G06Q 10/10 709/204 |
| 2010/0042704 A1* | 2/2010 | Chakra | G06Q 10/109 709/221 |
| 2012/0331404 A1* | 12/2012 | Buford | G06Q 10/10 715/757 |
| 2013/0173796 A1* | 7/2013 | Grab | H04N 21/251 709/225 |
| 2013/0297705 A1* | 11/2013 | Arora | G06Q 50/01 709/205 |
| 2014/0207867 A1* | 7/2014 | Kotler | H04L 65/4015 709/204 |

(Continued)

*Primary Examiner* — Phyllis A Book
(74) *Attorney, Agent, or Firm* — Jason Friday

(57) ABSTRACT

A computing device determines a collaboration event in which users are participating. For instance, the users' computing devices may be located within a same location, the users' communication devices may be currently engaging in a common communication session, or calendar entries of the users' calendars may indicate that they are currently participating in a common session. The computing device determines data related to the collaboration event, and may filter this data to yield the data most related to the collaboration event. The computing device provides the data related to the collaboration event to at least one of the users participating in the collaboration event.

14 Claims, 7 Drawing Sheets

(56) References Cited

U.S. PATENT DOCUMENTS

| | | | |
|---|---|---|---|
| 2015/0163217 A1* | 6/2015 | Lo ........................ | H04L 63/0823 726/6 |
| 2015/0326625 A1* | 11/2015 | Rosenberg .............. | H04L 67/42 715/753 |
| 2016/0094592 A1* | 3/2016 | Koch ................ | G06F 17/30312 709/204 |
| 2016/0149969 A1* | 5/2016 | Farmer ................ | G06Q 10/101 709/204 |
| 2017/0374425 A1* | 12/2017 | Disley ................ | H04N 21/4788 |

* cited by examiner

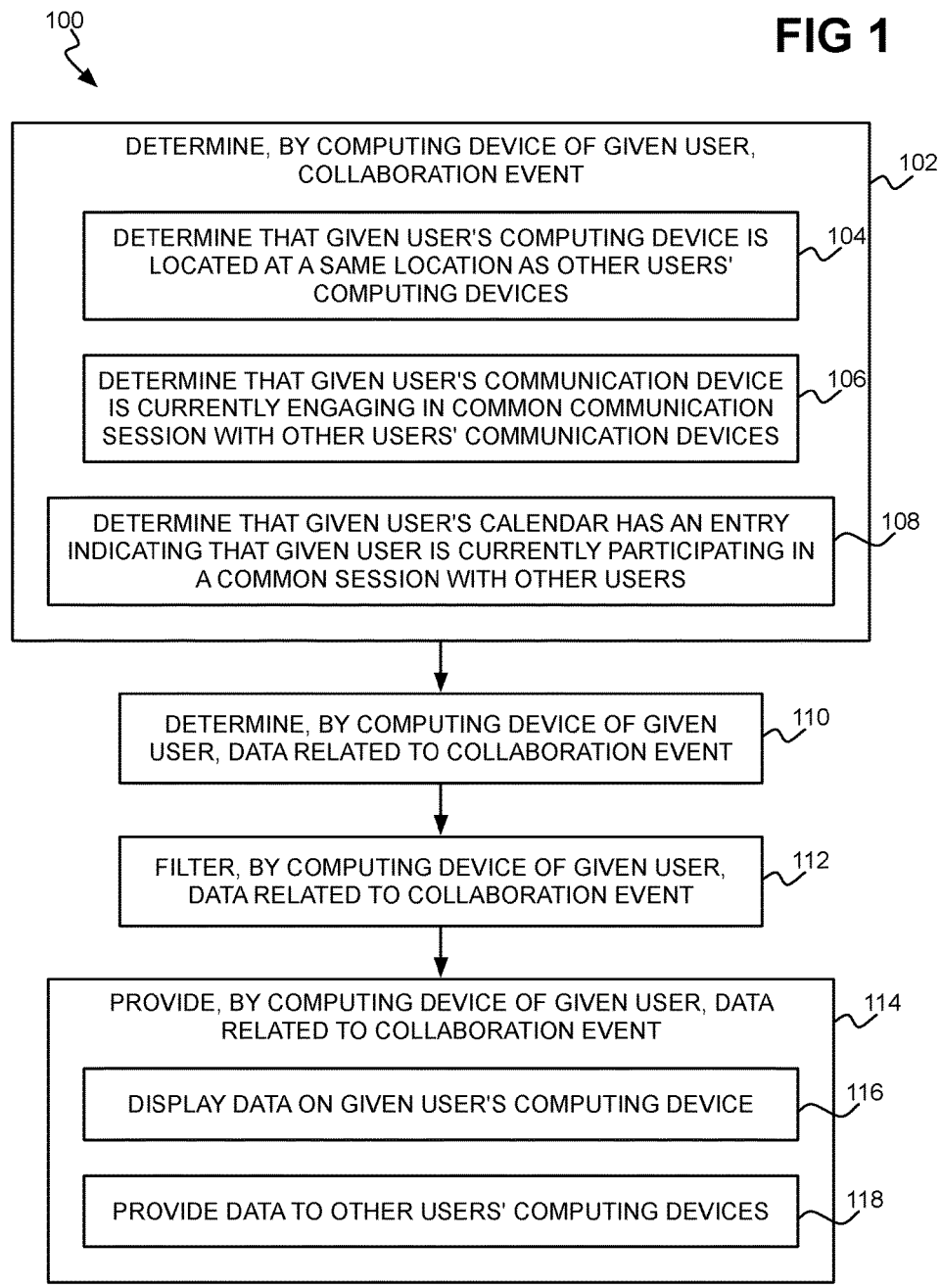

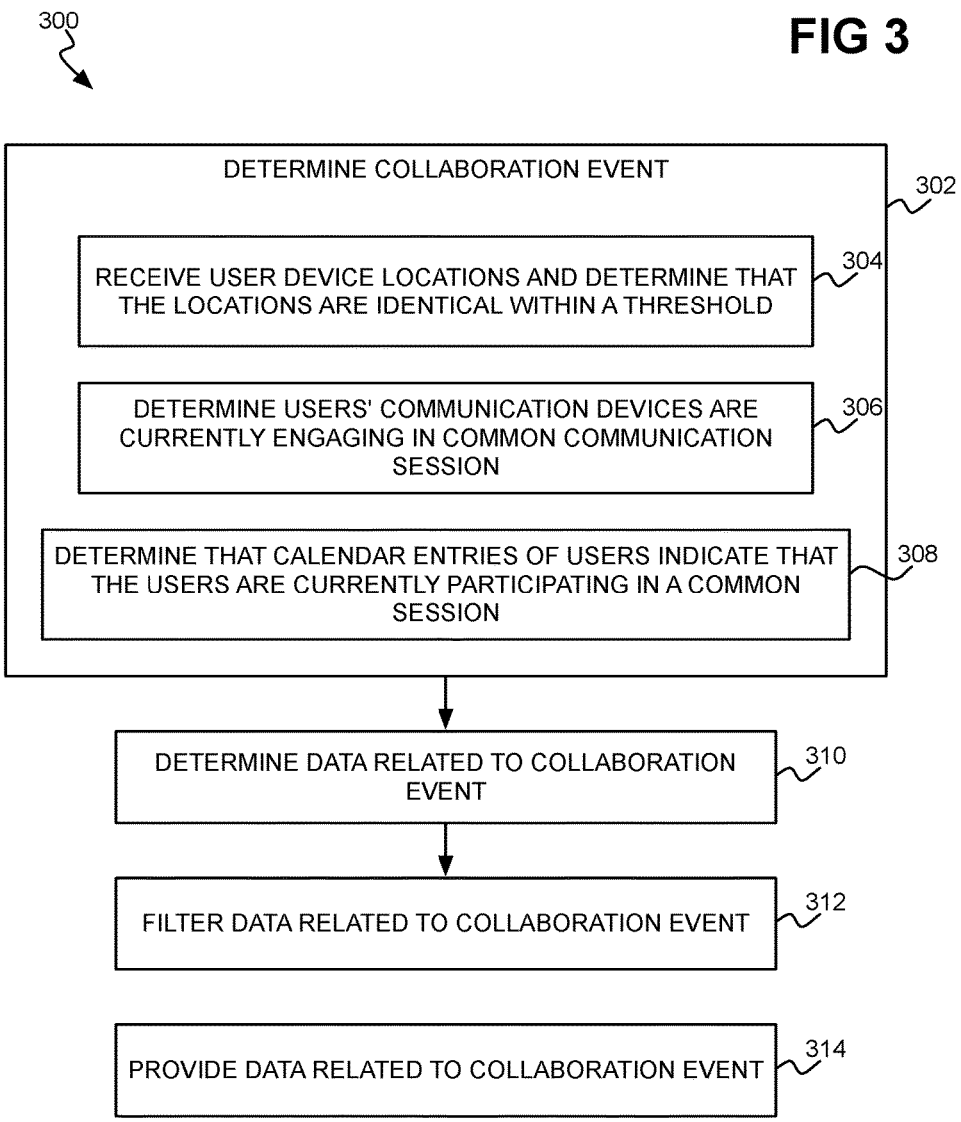

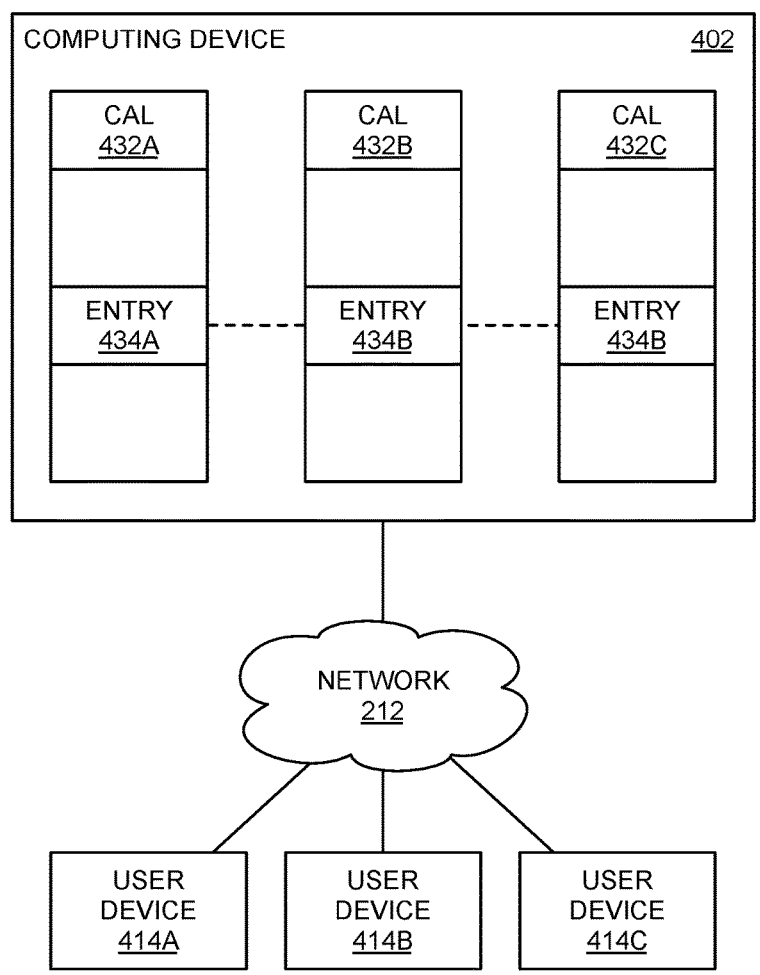

US 10,116,711 B2

DETERMINING AND PROVIDING DATA RELATED TO COLLABORATION EVENT

BACKGROUND

With the advent of modern computing systems, as well as the Internet, large amounts of information in the form of data are constantly being generated. Users send and receive email using emailing programs and using Internet web services. They exchange text messages with one another via their smartphones and other communication or computing devices. Users generate documents individually, as well as in concert with others, including word processing documents, spreadsheet documents, presentation documents, and other types of documents. They schedule meetings and other types of sessions with others using calendaring programs and using Internet web services.

SUMMARY

An example method includes determining, by a computing device, a collaboration event in which users are participating. The method includes determining, by the computing device, data related to the collaboration event. The method includes providing, by the computing device, the data related to the collaboration event to at least one of the users participating in the collaboration event.

An example non-transitory computer-readable data storage medium stores computer-executable code that a computing device of a given user executes to perform a method. The method includes determining a collaboration event in which users including the given user is participating. The method includes determining data related to the collaboration event. The method includes providing the data related to the collaboration event to at least the given user.

An example system includes network hardware to communicatively interconnect with computing devices of users. The system includes a processor, and a non-transitory computer-readable data storage medium storing computer-executable code executable. The code is executable by the processor to determine a collaboration event in which the users are participating. The code is executable by the processor to determine data related to the collaboration event. The code is executable by the processor to provide the data related to the collaboration event to at least one of the users participating in the collaboration event.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a flowchart of an example method of a distributed implementation for determining a collaboration event and providing data related to the collaboration event.

FIG. 3 is a flowchart of an example method of a centralized implementation for determining a collaboration event and providing data related to the collaboration event.

FIGS. 4A, 4B, and 4C are diagrams depicting example collaboration events that can be determined in the method of FIG. 3.

DETAILED DESCRIPTION

Figure 2A:
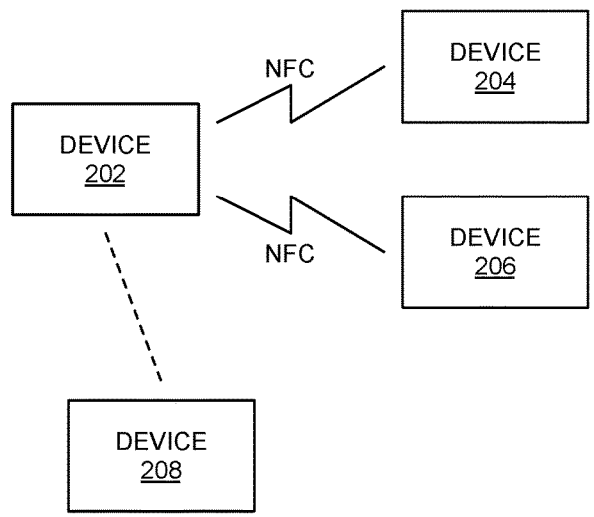
FIGS. 2A, 2B, and 2C are diagrams depicting example collaboration events that can be determined in the method of FIG. 1.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, users generate and receive large amount of information in the form of data, particularly with the rise of interconnected devices over networks like the Internet. Such voluminous data has proven to be both a blessing and a curse. Positively, when performing a given task, a user has many different sources of information available to him or her to assist in completing the task. Negatively, however, because the amount of data can be so staggering, locating the relevant information can be difficult if not impossible.

Users can collaborate with one another in both in-person and virtual contexts. In-person contexts can include when users meet within a conference room, for instance, for a preplanned meeting. Such in-person contexts can also be decidedly less formal, where two or more users working on the same project happen to be physically located in the same location, such as a hallway, a coffee shop, a break room, and so on. Virtual contexts in which users can collaborate with one another include email streams in which they exchange emails with one another, as well as live chat sessions or exchanges of text messages in which users communicate with one another on their respective computing devices. Such virtual contexts can further include videoconferences, teleconferences, and telephone calls, where the users are not physically present at the same location.

Disclosed herein are techniques to determine and provide data related to a collaboration event. A collaboration event is an in-person or virtual meeting of users in which the users may potentially be working on the same task i.e., an in-person or virtual get-together of multiple users in which they may be collaborating with one another. In the techniques disclosed herein, once a collaboration event in which multiple users are participating has been determined, data related to the event is determined and provided to at least one of the users in question.

As such, users participating in a collaboration event do not have to laboriously attempt to locate information that may assist them in the collaboration. Rather, the data is identified and presented to the users. The data can be that which at least a predetermined percentage of the users have in common. For example, if there are ten users, email messages in which four of the users are parties to the email (as senders or receivers) may be included, and similarly for online live chat logs, text messages, and so on. Documents, including word processing, spreadsheet, and presentation documents, as well as other types of documents, that have been worked on by at least four users in this example may also be included.

The techniques disclosed herein thus can determine a collaboration event as an in-person or virtual meeting of multiple users, regardless of whether an actual collaboration is in fact occurring among these users. The techniques disclosed herein can determine and provide data related to the collaboration event as that which at least a predetermined percentage of the users have in common, regardless of whether the data is in fact related to an actual collaboration occurring among these users. In these respects, the techniques disclosed herein provide a novel manner to detect when a collaboration occurs and what data is related to the collaboration.

Specifically, rather than attempting to determine whether a meeting (in-person or virtual) of users is an actual collaboration, the techniques disclosed herein can presume that it is, which as noted above is referred to as a collaboration event. Rather than attempting to determine whether data is related to a particular collaboration, the techniques disclosed herein can presume that data that is common to at least a predetermined percentage of the users is so related, which is referred to as data related to the collaboration event. As such, complex algorithmic approaches to determine when a collaboration is actually occurring and what data is in fact related to the collaboration, which are likely to miss some actual collaborations that are occurring and that are likely to miss some data related to such collaborations, are advantageously avoided via the techniques disclosed herein.

FIG. 1 shows an example method 100 by which a computing device of a user determines a collaboration event and provides data related to the event. The method 100 can be considered a distributed implementation of the techniques disclosed herein, as compared to a centralized implementation described later in the detailed description. The method 100 is described in relation to the computing device of a given user. The method 100 may be performed by the computing device of just one user, by each of the devices of some of the users, or by each of the devices of all the users. The computing device of the given user may be a computer, like a desktop or a laptop computer, a tablet computing device, or another type of computing device, such as a mobile computing device like a smartphone.

The given user's computing device determines a collaboration event in which a number of users, including the given user, are participating (102). As noted above, a collaboration event means that the users may be currently collaborating with one another, but does not necessarily mean that they actually are. In this way, then, a collaboration event is distinguished from an actual collaboration, in that a collaboration event is inclusive of an actual collaboration but also inclusive of scenarios in which there is a potential collaboration even if one is not occurring. It is noted that a collaboration event involves at least two users in the method 100: the given user, and at least one other user. However, the method 100 is more generally described where there are multiple other users as well as the given user.

Three different ways by which a collaboration event can be determined by the computing device of the given user are as follows. First, the given user's computing device can determine that it is located at a same location, within a threshold, as the computing devices of the other users (104). A same location is said to be within a threshold because the computing devices will be located near one another, such as within the same conference room, and so on, but not in actuality in the exact same location. The threshold may be, for instance, within a few meters or yards.

For example, computing devices can have near-field communication (NFC) capability. When a computing device can detect the presence of another computing device via NFC, this means that the two computing devices are near one another, and thus located at the same location within a threshold. Therefore, the users of a collaboration event include the given user, and the users having computing devices that the given user's computing device can detect via NFC in this example. In a similar implementation, computing devices' Bluetooth capability may be used in addition to or in lieu of their NFC capability in this respect.

As another example, the computing devices may be able to determine their locations via global positioning system (GPS) capability, or via triangulation approaches achieved via Wi-Fi and/or cellular phone communications. The given user may have received permission from the other users to have their computing devices report the current locations of the computing devices to the given user's computing device. For instance, different smartphone platforms permit users to share their locations with other users. Therefore, when the given user's computing device determines that there are computing devices of other users located at the same location within a threshold, it is determined that a collaboration event is occurring between the given user and these other users.

A second way to determine that a collaboration event is occurring is by the given user's computing device determining that a communication device of the given user is currently engaging in a common communication session with communication devices of the other users (106). The communication device of a user in this respect may be the same or a different device than the user's computing device. For example, if the given user is on a conference call or other type of phone call with the other users via telephone devices, then the computing device determines that a collaboration event is occurring between the given user and the other users. The computing device of the given user may be this user's telephone device (such as a smartphone). If not, the computing device, such as a computer, may be communicatively linked to the communication device to receive information regarding the phone call.

Other types of common communication sessions include videoconferences, live chat sessions, email streams, and text messaging streams. For asynchronous communication sessions like email and text messaging streams, if the given user has sent or received a predetermined number of email or text messages within a predetermined current period of time, then the computing device may determine that a collaboration event is currently occurring. For example, the predetermined number of messages may be three, and the predetermined current period of time may be in the last fifteen minutes.

A third way to determine that a collaboration event is occurring is by the given user's computing device determining that this user's calendar has a calendar entry indicating that the user is (or should be) currently participating in a common session with other users (108). For example, if the time is currently 1 PM, and if the given user's calendar has an event indicating that the user is supposed to meet with, call, videoconference, and so on, one or more other users, then the computing device of the given user determines that there is a collaboration event between the given user and these other users. It is noted that although three specific ways by which a collaboration event is detected have been described in relation to parts 104, 106, and 108 of the method 100, other approaches to determine a collaboration event can also be employed.

Figure 2B:
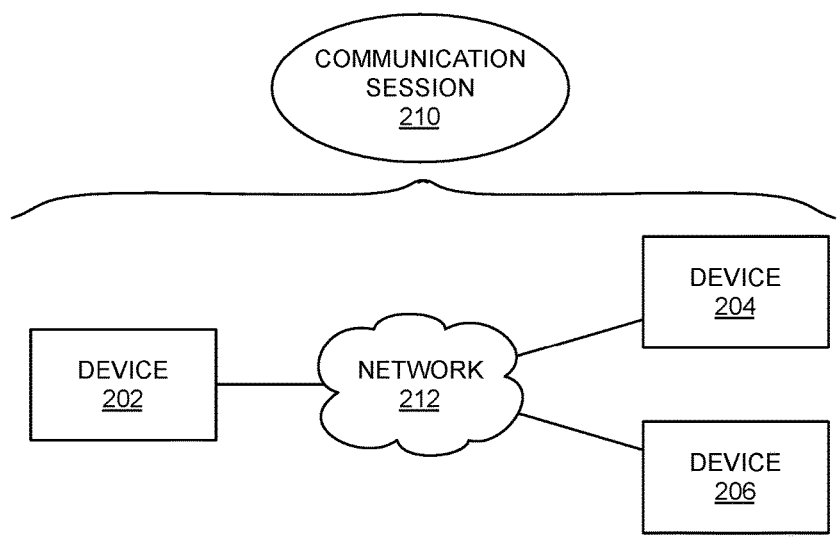
Figure 2C:
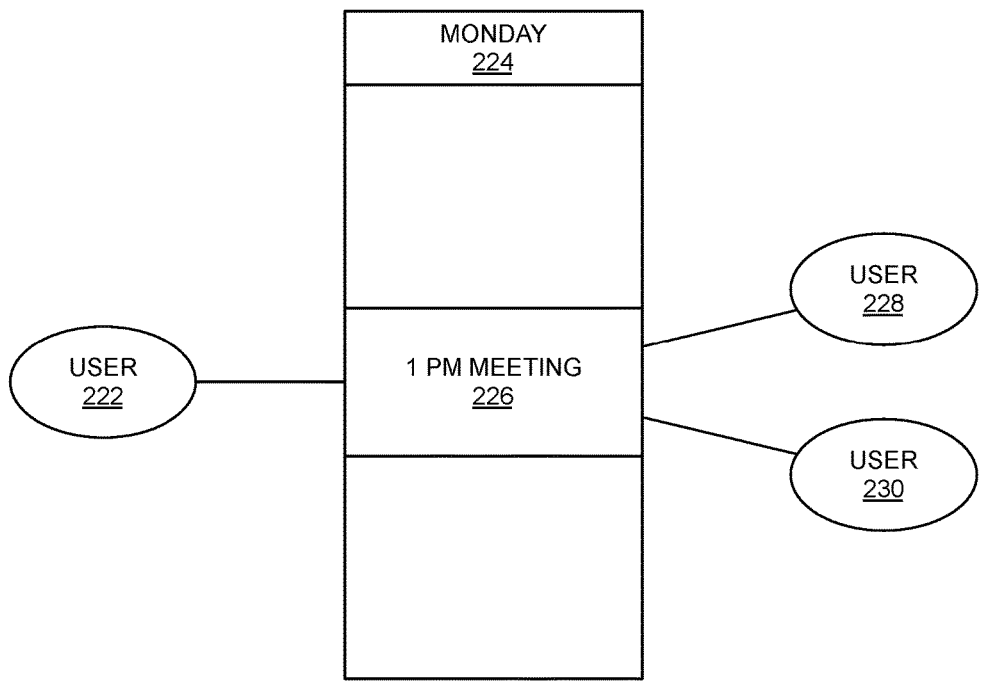

FIGS. 2A, 2B, and 2C illustratively depict example collaboration events of parts 104, 106, and 108 of the method 100, respectively. In FIG. 2A, a computing device 202 of a given user can detect the presence of computing devices 204 and 206 of two other users via NFC. However, the computing device 202 cannot detect the presence of a computing device 208 of a third other user via NFC. Therefore, the collaboration event is determined by the computing device 202 as including the given user of the device 202, and the users of the computing devices 204 and 206, and not the user of the computing device 208.

In FIG. 2B, the given user of the computing device 202 is participating in a communication session 210 with the users of the computing devices 204 and 206 over a network 212, such as the Internet, a local-area network (LAN, a wide-area network (WAN), a wired network, a wireless network, a telephony network, and/or another type of network. The communication session 210 may be a phone call or teleconference, a videoconference, and so on. The collaboration event is determined by the computing device 202 as including the given user of the device 202 and the users of the computing devices 204 and 206.

In FIG. 2C, the computing device of a given user 222 maintains an electronic calendar 224 of the appointments of the given user 222, including a calendar entry 226 that describes a 1 PM meeting between the given user 222 and the users 228 and 230. When the current time is 1 PM on the day in question, the computing device of the given user 222 determines the collaboration event as including the given user 222 and the users 228 and 230. Note that in FIG. 2C, then, just the calendar of the given user 222 is used to determine the other users of the collaboration event.

Referring back to FIG. 1, once it has been determined that there is a collaboration event between the given user and the other users, the given user's computing device determines data related to the collaboration event (110). Such data can include data stored by or that is accessible to the computing device of the given user that is related to the collaboration event. Data that is accessible to the computing device but that is not stored by the computing device can include data stored externally, such as on a network-attached storage (NAS) device that the computing device can access over a network. The data is related to the collaboration event in that it is related to the users of the collaboration event. For example, such data can include email messages that the users have exchanged with one another, as well as documents that the users have worked on together. The data can also include media that the users have shared with one another (images, video, and so on), as well as calendar entries of sessions, such as meetings, phone calls, and so on, that the users have in common.

The given user's computing device may filter the data related to the collaboration event that has been determined to yield a subset of data that is most related to the event (112). For example, just the data that at least a predetermined percentage, such as 75%, of the users have exchanged with one another, have worked on together, have shared with one another, and/or have in common may be considered as most related. For instance, there may be five users within the collaboration event. A document that just two of the users worked on together may not be deemed as most relevant to the collaboration event, whereas a document that four of the users worked on together may be deemed as a document that is most relevant to the collaboration event.

The given user's computing device provides the data related to the collaboration event, as may have been filtered in part 112, to at least the given user (114). For instance, the computing device may display this data to the given user (116). The given user may be provided a list of each data item, along with a brief portion thereof in one implementation, so that this user has an overview of the data that the computing device determined as related to the collaboration. The computing device may highlight such data items in their respective application programs so that when the given user is reviewing the data within an application program, the data items relevant to the collaboration event are easily discernible. As an example of the latter, in an email application program the emails that are related to the collaboration event may be highlighted, and in a file system manager program the documents that are related to the collaboration event may be highlighted.

The given user's computing device may provide the data related to the collaboration event to the computing devices of the other users (118), such as by transmitting this data to those computing devices. Because the method 100 is a distributed implementation of the techniques disclosed herein, that is, the other users' computing devices may not necessarily be performing the method 100, and/or may not have access to the same data that the given user does. Therefore, the given user may want to share the data related to the collaboration event with the other users participating in the collaboration event.

FIG. 3 shows an example method 300 by which a computing device determines a collaboration event and provides data related to the event. The method 100 can be considered a centralized implementation of the techniques disclosed herein, because the computing device performing the method 300 can be a centralized device and not a device of any particular user. For example, the computing device may be a computer, like a server computer, that is communicatively connected to the (client) computing devices of users.

The computing device determines a collaboration event in which a number of users are participating (302). Three different ways by which a collaboration can be determined are as follows. First, the computing device may receive the locations of the users' computing devices, and determine that a collaboration event is occurring with respect to those users who are identically located within a threshold (304). For example, the users' computing devices may have GPS capability, or another way by which they are able to determine their locations. The computing devices may transmit their locations to the computing device performing the method 300 as the locations change. When the computing device performing the method 300 determines that multiple users' computing device have locations that are identical within a threshold such as within a few feet or a few meters then the computing device determines that a collaboration event is occurring with respect to these users.

A second way to determine that a collaboration event is occurring is by determining that the users' communication devices are currently engaging in a common communication session (306). As noted above, the communication session may be a phone call or teleconference, a videoconference, a live online chat session, an email stream, a text messaging stream, or another type of communication session. The computing device performing the method 300 can detect such a phone call or a teleconference, and thus determine the collaboration event and the users participating therein, if it is the computing device responsible for connecting such calls, or otherwise has access to current phone calls and the parties to those calls. The computing device can detect a videoconference or chat session is occurring likewise if it the platform by which videoconferences or chat sessions are established, or has access to such a platform. The computing device may be the email server or the text messaging server by which users communicate via emails or text messages, or may have access to such a server to determine a collaboration event occurring via email or text message.

A third way to determine that a collaboration event is occurring is by determining that the calendar entries of calendars of users indicate that they are currently participating in a common session (308), such as a meeting, phone call, and so on. The computing device performing the method 300 may, for instance, host the users' calendars, or have access to the computer that does, and therefore can determine when a user has a calendar entry involving one or more other users. Furthermore, the computing device may be able to determine that a collaboration event is occurring even if a calendar entry of a user does not specify other users. For example, if three users each have a calendar entry at the same time and day regarding the status of the same project and that is to be held at a particular location, the computing device can conclude that these users are participating in a collaboration event at that time. It is noted that although three specific ways by which a collaboration event is detected have been described in relation to parts 304, 306, and 308 of the method 300, other approaches can also be employed to determine a collaboration event.

Figure 4A:
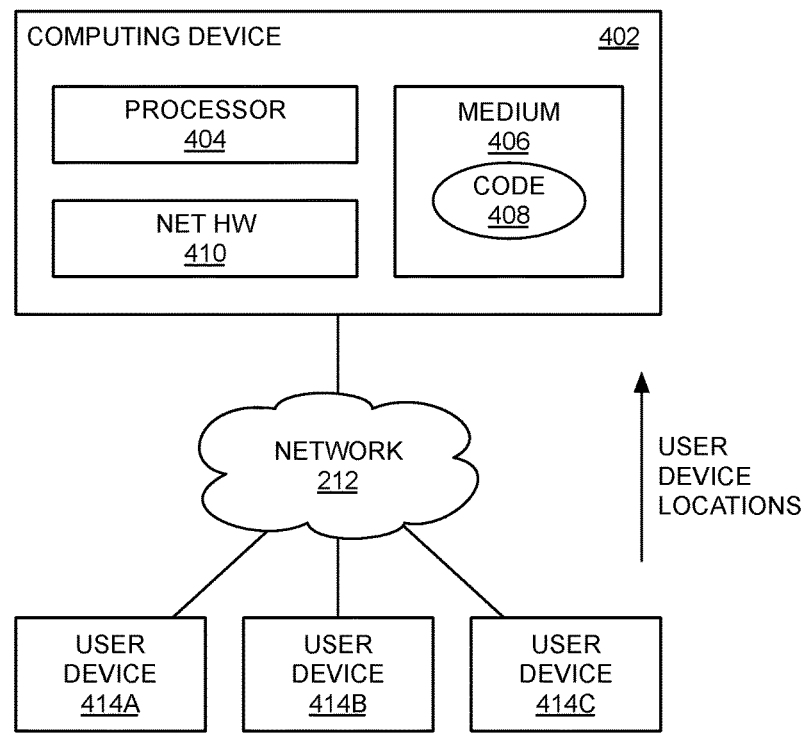
Figure 4B:
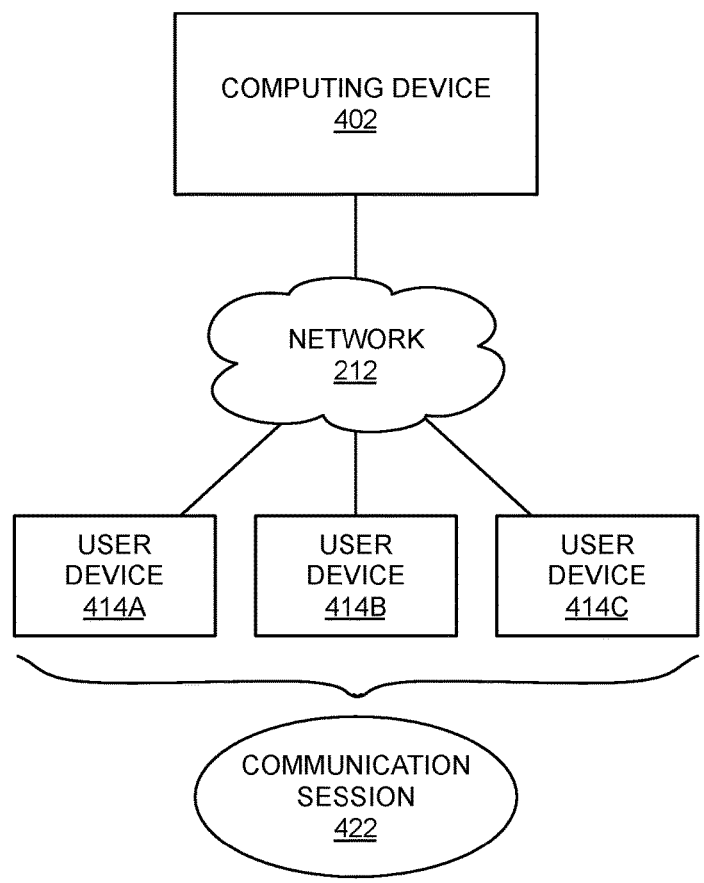

FIGS. 4A, 4B, and 4C illustrative depict example collaboration events of parts 304, 306, and 308 of the method 300, respectively. In FIG. 4A, a computing device 402 includes a processor 404, a non-transitory computer-readable data storage medium 406 storing computer-executable code 408, and network hardware 410, such as a network adapter, to communicate over the network 212 with user devices 414A, 414B, and 414C, which are collectively referred to as the user devices 414. The processor 404 executes the code 408 to perform the method 300. The user devices 414 thus report their locations to the computing device 402, which receives these locations, and on the basis thereof can determine a collaboration event in which the users of the devices 414 are participating if the locations are identical within a threshold.

In FIG. 4B, the computing device 402 provides a communication session platform, such as a videoconferencing or other type of platform, by which a communication session 422 is established among the user devices 414. For example, the user of the user device 414A may create the communication session 422 by communicating with the computing device 402 over the network 212, where the device 402 is said to host the session 422. The user of the user device 414A may invite the users of the user devices 414B and 414C to participate in the communication session 422, subsequent to which the user devices 414B and 414C join the session 422 by communicating with the computing device 402 over the network 212. As such, the computing device 402 determines a collaboration event as the communication session 422 in which the users of the devices 414 are participating.

In FIG. 4C, the computing device 402 maintains electronic calendars 432A, 432B, and 432C, collectively referred to as the electronic calendars 432, for the users of the user devices 414A, 414B, and 414C, respectively. The users of the user devices 414 can communicate with the computing device 402 over the network 212 to add, remove, and edit calendar entries from their respective calendars 432. The calendars 432A, 432B, and 432C may have calendar entries 434A, 434B, and 434C, collectively referred to as the calendar entries 434, which correspond to one another. That is, the entries 434 may be at least substantially identical in that they specify the same time, location, and subject matter of a session like a meeting. Even if each of the entries 434 does not specify all the users of the user devices 414, due to their at least substantially identical nature the computing device 402 can determine that the sessions of the entries 434 are the same session. On this basis, the computing device 402 can determine a collaboration event as occurring at the time and date of the entries 434, in which the users of the user devices 414 are participating.

Referring back to FIG. 3, once the computing device has determined that there is a collaboration event between at least two users, the computing device determines data related to the collaboration event (310). Such data can include data stored by or that is accessible to the computing device, as has been described in relation to the method 100. Similarly, the computing device can filter the data related to the collaboration event to yield the subset thereof that is most related to the event (312), as in the method 100. The computing device then provides the data related to the collaboration event, as may have been filtered, to the computing devices of the users participating in the event (314). The computing device may transmit a list of the data items to each user's computing device, and permit each user to select individual data items for transmission to his or her computing device.

The method 300 is thus similar to the method 100, but differs in that a centralized computing device performs the method 300 as opposed to the computing device of each of at least one of the users of the collaboration event as in the method 100. The advantages associated with the centralized approach of the method 300 include that computer-executable code providing the functionality of the method does not necessarily have to be installed at each user's computing device. By comparison, the advantages associated with the decentralized approach of the method 100 include that a centralized computing device does not have to be preconfigured to provide the functionality of the method.

The techniques disclosed herein thus provide for an innovative manner by which a potential collaboration, referred to herein as a collaboration event, can be determined, without having to determine whether a collaboration is in fact occurring or not. Once such a collaboration event has been detected or determined, data related to the event can be determined and provided to the users participating in the collaboration event, on the basis of such data being related to at least a percentage of these users, regardless of whether the data is in fact related to the event or not. As such, the techniques disclosed herein readily identify potentially related data to a potential collaboration to users who may be participating in this collaboration in a novel manner, assisting these users in locating data relevant to the collaboration.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:
1. A method comprising:
 determining, by a computing device, a collaboration event regarding a plurality of users, regardless of whether an actual collaboration is in fact occurring among the users;
 determining, by the computing device, data related to the collaboration event, as data that at least a predeter- mined percentage of the users have in common, regardless of whether the data is in fact related to the actual collaboration; and providing, by the computing device, the data related to the collaboration event to at least one of the users participating in the collaboration event, wherein determining the collaboration event comprises one of:

receiving locations of devices of the users and determining that the locations are identical within a threshold, the computing device determining the collaboration event responsive to determining that the locations are identical within the threshold;

determining that communication devices of the users are currently engaging in a common communication session, the computing device determining the collaboration event responsive to determining that the communication devices are currently engaging in the common communication session.

2. The method of claim 1, wherein determining the data related to the collaboration event comprises:

determining, by the computing device, the data stored by or accessible to the computing device that is related to the collaboration event.

3. The method of claim 2, wherein providing the data related to the collaboration event comprises:

providing, by the computing device, the data stored by or accessible to the computing device to a computing device of each user participating in the collaboration event.

4. The method of claim 1, wherein the computing device is of a given user of the users, and wherein determining the collaboration event comprises:

determining, by the computing device, that the computing device of the given user is located at a same location, within a threshold, as computing devices of other users of the users, wherein the computing device of the given user determines that the users are participating in the collaboration event responsive to determining that the computing device of the given user is located at the same location, within the threshold, as the computing devices of the other users.

5. The method of claim 1, wherein the computing device is of a given user of the users, and wherein determining the collaboration event comprises:

determining, by the computing device, that a communication device of the given user is currently engaging in a common communication session with communication devices of other users of the users, wherein the computing device of the given user determines that the users are participating in the collaboration event responsive to determining that the communication device of the given user is currently engaging in the common communication session with the communication devices of the other users, and wherein the computing device of the given user is one of a same device and a different device than the communication device of the given user.

6. The method of claim 1, wherein the computing device is of a given user of the users, and wherein determining the data related to the collaboration event comprises:

determining, by the computing device, the data stored by or accessible to the computing device that is related to the collaboration event.

7. The method of claim 1, wherein providing the data related to the collaboration event comprises one or more of:

displaying, by the computing device, the data stored by or accessible to the computing device that is related to the collaboration event to the given user;

providing, by the computing device, the data stored by or accessible to the computing device that is related to the collaboration event to computing devices of other users of the users participating in the collaboration event.

8. The method of claim 1, wherein the data related to the collaboration event comprises one or more of:

email messages that the users have exchanged with one another;

documents that the users have worked on together;

media that the users have shared with one another; and calendar entries of sessions that the users have in common.

9. The method of claim 1, further comprising, after determining the data related to the collaboration event and before providing the data related to the collaboration event:

filtering, by the computing device, the data related to the collaboration event to yield a subset of the data that is most related to the collaboration event.

10. The method of claim 9, wherein the data that is most related to the collaboration event comprises the data that at least a predetermined percentage of the users have one or more of exchanged with one another, have worked on together, have shared with one another, and have in common.

11. A non-transitory computer-readable data storage medium storing computer-executable code that a computing device of a given user executes to perform a method comprising:

determining a collaboration event regarding a plurality of users including the given user, regardless of whether an actual collaboration is in fact occurring among the users;

determining data related to the collaboration event, as data that at least a predetermined percentage of the users have in common, regardless of whether the data is in fact related to the actual collaboration; and providing the data related to the collaboration event to at least the given user, wherein determining the collaboration event comprises one of:

determining that the computing device of the given user is located at a same location, within a threshold, as computing devices of other users of the users, such that the computing device of the given user determines the collaboration event responsive to determining that the computing device of the given user is located at the same location, within the threshold, as the computing devices of the other users;

determining that a communication device of the given user is currently engaging in a common communication session with communication devices of other users of the users, such that the computing device of the given user determines the collaboration event responsive to determining that the communication device of the given user is currently engaging in the common communication session with the communication devices of the other users.

12. The non-transitory computer-readable data storage medium of claim 11, wherein determining the data related to the collaboration event comprises:

determining the data stored by or accessible to the computing device that is related to the collaboration event, and wherein providing the data related to the collaboration event comprises one or more of:

displaying the data stored by or accessible to the computing device that is related to the collaboration event to the given user;

providing the data stored by or accessible to the computing device that is related to the collaboration event to computing devices of other users of the users participating in the collaboration event.

13. A system comprising:

network hardware to communicatively interconnect with computing devices of a plurality of users;

a processor; and a non-transitory computer-readable data storage medium storing computer-executable code executable by the processor to:

determine a collaboration event regarding a plurality of users, regardless of whether an actual collaboration is in fact occurring among the users;

determine data related to the collaboration event, as data that at least a predetermined percentage of the users have in common, regardless of whether the data is in fact related to the actual collaboration; and provide the data related to the collaboration event to at least one of the users participating in the collaboration event, wherein the computer-executable code is executable by the processor to determine the collaboration event by one of:

receiving locations of devices of the users, and determining that the locations are identical within a threshold, such that the processor determines the collaboration event responsive to determining that the locations are identical within the threshold;

determining that communication devices of the users are currently engaging in a common communication session, such that the processor determines the collaboration event responsive to determining that the communication devices are currently engaging in the common communication session.

14. The system of claim 13, wherein the computer-executable code is executable by the processor to determine the data related to the collaboration event by determining the data stored by a storage device of the system or accessible to the system over a network via the network hardware that is related to the collaboration event, and wherein the computer-executable code is executable by the processor to provide the data related to the collaboration event by providing the data stored by or accessible to the computing device to a computing device of each user participating in the collaboration event, over the network via the network hardware.

* * * * *